United States Patent [19]

Miura

[11] 4,290,229

[45] Sep. 22, 1981

[54] INSTALLATION FOR CULTIVATION OF CROPS ON WATER

[76] Inventor: Masahiro Miura, 11-2, Miyanishi-cho, 5 chome, Fuchyu-City, Tokyo, Japan

[21] Appl. No.: 121,557

[22] Filed: Feb. 14, 1980

[30] Foreign Application Priority Data

Oct. 4, 1979 [JP] Japan ............................. 54-128723

[51] Int. Cl.³ .............................................. A01G 9/02
[52] U.S. Cl. ........................................ 47/66; 47/27; 47/60; 47/65; 47/79
[58] Field of Search ............... 47/1 R, 27, 69, 79–81, 47/59–66

[56] References Cited

U.S. PATENT DOCUMENTS

| | | | |
|---|---|---|---|
| 2,813,063 | 11/1957 | Bjorksten | 47/27 UX |
| 3,095,670 | 7/1963 | Raab | 47/79 X |
| 4,125,963 | 11/1978 | Johnson | 47/27 |
| 4,178,715 | 12/1979 | Greenbaum | 47/27 X |

FOREIGN PATENT DOCUMENTS

| | | | |
|---|---|---|---|
| 223796 | 8/1959 | Australia | 47/27 |
| 2228422 | 12/1974 | Fed. Rep. of Germany | 47/27 |
| 224154 | 11/1942 | Switzerland | 47/81 |

Primary Examiner—Steven A. Bratlie
Attorney, Agent, or Firm—Jordan and Hamburg

[57] ABSTRACT

An installation for the cultivation of crops on water includes a box-like floatable outer housing and an inner cultivation housing supported therewithin and forming a double-walled bottom and double-wall sidewalls therewith. A transparent plate glass roof surmounts the outer housing and is in air-tight relationship therewith. A drip plate of plate glass and having a plurality of holes extending therethrough is positioned over the cultivation housing. The bottom of the installation and the region between the double-wall sidewalls are in communications with the interior of the cultivation housing through the holes in the drip plate. A plurality of ventilation tubes are mounted in the cultivation housing and extend through the drip plate and roof for communication with the outside air. One set of ventilation tubes extends beyond the roof to an elevation higher than that of a second set of the ventilation tubes. A lower portion of each ventilation tube opens into the interior of the cultivation housing. A quantity of soil is contained in the lower section of the cultivation housing and a quantity of water is contained in the double-wall bottom.

9 Claims, 13 Drawing Figures

INSTALLATION FOR CULTIVATION OF CROPS ON WATER

BACKGROUND OF THE INVENTION

In general, crops have usually been cultivated on land whatever the type may be. However, such cultivation is dependent upon the configuration of the ground, size of the cultivation areas, cultivation condition, cultivation circumstances etc. Furthermore, cultivation of crops on land is sometimes subject to air pollution noxious insects or plant diseases and considerable damage often results. The present invention resolves the above mentioned difficultes by providing an installation for crop cultivation on a body of water and by utilizing solar energy. The technique can widely be developed and utilized to provide a remaining huge cultivation area on bodies of water for future use. Such cultivation areas are free from the restrictions inherent in crop cultivation on land.

SUMMARY OF THE INVENTION

The present invention relates to an installation for crop cultivation on a body of water, the principal object of which is to provide a suitable place for crop cultivation on water by utilizing seas or lakes where the restrictions on the crop cultivation as are often seen on land such as, configuration of the ground, limitation of cultivating areas, cultivating conditions, cultivating circumstances, etc. are avoided.

Another object of the present invention is to preserve a huge remaining area for crop cultivation on water for future use, being free from air pollution, noxious insects and plant disease. A further object of the present invention is to provide a common area on water for fishery and agricultural use, having utility apart from merely obtaining marine or aquatic products.

The above-mentioned objects are achieved in the manner hereinafter described.

BRIEF DESCRIPTION OF THE DRAWINGS

FIG. 1-B is a plan view showing the manner by which the cultivation housing is supported;

FIG. 1-C is a plan view showing a base for the cultivation housing;

FIGS. 3-A and 3-B show plan and elevational views of connected installations for the cultivation of crops on water;

FIGS. 6-A and 6-B are fragmentary cross-sectional views showing the check valve for preventing a counter flow of water and the inlet hole;

FIGS. 7-A and 7-B are fragmentary elevational views showing the ventilation tube and rotatable hood.

DETAILED EXPLANATION OF THE INVENTION

The present invention relates to an installation for crop cultivation on water.

The installation for crop cultivation on water according to the present invention comprises a box-shaped tank employed as a floating boat and wherein a cultivation housing is provided which is air tight, the soil carried being covered within the cultivation housing to form a cultivation room, the soil being accessible to be watered in order to be able to cultivate the crop and furthermore, the above-mentioned soil is prepared to be a suitable cultivation soil with moisture through conversion of the water evaporated from a reservoir of water at the bottom of the floating boat into condensed water generated owing to the difference between the temperature between the open air and that on the inside of the floating boat.

Hereinafter, embodiments of the present invention will be explained in more detail with reference to the drawings.

Figure 1:
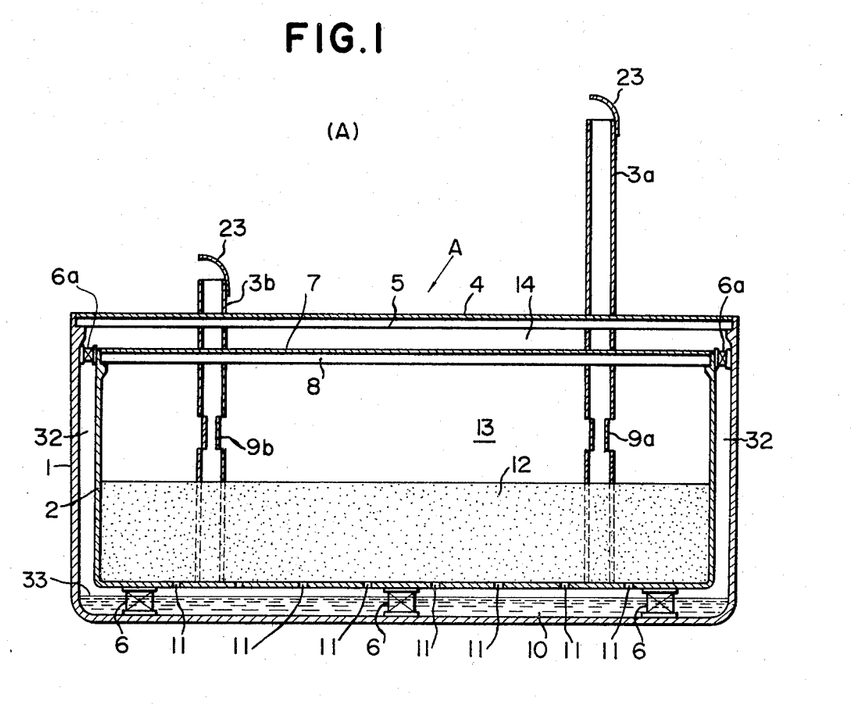
FIG. 1 is an elevational cross-sectional view showing an installation for crop cultivation on water according to the present invention.

FIG. 1 shows an Example of an installation A for crop cultivation on water according to the present invention. The above-mentioned installation A comprises a structure in the form of a boat which floats on the water, the boat 1 being in the form of a box-shaped tank or outer housing. A cultivation housing 2 and ventilation tubes 3a, 3b, are provided in the floating boat. The floating boat may be made of iron plate, but it is not limited to same, any material strong enough to withstand waves, sea water, water etc. may also be used. The floating boat 1 is made approximately in the form of a square shaped box and the length of a side thereof is about 12 m. The height thereof is about 3 m; and the floating boat is of 1 m to 1.5 m draught. An upper surface of the floating boat is covered to be substantially air tight with a transparent plate glass 4 which is supported by an upper beam 5 to form a roof thereof. Inside the floating boat 1, a cultivation housing 2 is provided to be integral in the form of a box and is made of resinous materials such as FRP, etc. The cultivation housing 2 is firmly secured to both the base and the sides of the floating boat by means of a plurality of support members 6, 6a . . . as shown in FIG. 1-B. Accordingly, the floating boat 1 and the cultivation housing 2 may thus constitute a double bottom construction and a double side wall construction, thereby preventing damage to the cultivation housing 2 owing to collisions between the floating boats, running aground and other accidents. A drip plate 7 for providing drops of water is made of a wave shaped transparent or semi-transparent plate glass and covers all of the upper surface of the cultivation housing 2. Plate 7 is supported by a middle beam 8. The plate 7 is provided with a number of small holes 25. (In FIG. 5, the disposition of the small holes is partially shown). Inside the cultivation housing 2, at least one ventilation tube projecting through the plate glass roof 4 is provided. A plurality of the ventilation tubes is provided. The higher ventilation tube 3a . . . is used for discharging the air from the cultivation room and the lower ventilation tube 3b . . . is used for admission of the open air from outside the boat. Numerical references 9a . . . and 9b . . . respectively identify a suction inlet and a discharge outlet for the air inside the cultivation room. The space formed by the double bottom construction is used as a water tank 10 and a quantity of water 33 is an amount not sufficient to reach the bottom of the cultivation housing 2 is previously poured thereinto. A plurality of holes 11 . . . are provided on the bottom of the cultivation housing 2 as shown in FIG. 1-C and serve both as inlet and discharge openings. The holes are used for draining excessive water from the soil 12 or for sucking up a quantity of water from inside the water tank 10 through the direct contact of the changeable level of the water in the tank 10 with the bottom of the cultivation housing owing to pitching and rolling of the floating boat. A quantity of the soil with a depth equal to the draught of the floating boat is brought into the boat and a sufficient quantity of water has previously been poured on the soil thus brought from the outside of the floating boat. The cultivation room 13 is high enough for a worker to conduct operations while in a standing position. The space between the plate glass roof 4 and plate 7 forms a room 14 for generating quantity of water to be passed through plate 7 onto the soil 12. There is a free flow of air throughout the space 32, formed by the double sidewall from the room 14 for generating water and the air is free to flow into contact with the level in water of the water tank 10.

The temperature of the cultivation room 13 will rise owing to the solar heat. When this occurs the air surrounding the room 14 and the cultivation housing 2 is also warmed up. The temperature in the cultivation room 13 may be adjusted by the open air inlet or outlet through the suction inlet 9a or the discharge outlet 9b of the ventilation tubes 3a and 3b. On the other hand, the temperature of air in the room 14 and in the space between the double side walls will rise to evaporate the water in the water tank 10. Accordingly, the moisture in the air surrounding the outer peripheral surface of the cultivation housing is warmed up. The water thus evaporated is converted to droplets of water in the room 14 and such water will fall upon the soil through small holes 25 formed in plate 7 so as to prevent undesirable drying of the surface of the soil. The time of generating or condensing drops of water reaches a maximum during the hours from the evening towards early morning when the temperature becomes considerably low. The air containing the moisture in the room 14 is cooled by the fall of the temperature of the plate glass roof 4 itself in the evening and early morning and by passing of the cool outside air through the cultivation room from the ventilation tube, thereby generating drops of water on an inner peripheral surface of the plate glass roof 4 and on the plate 7. The plate 7 with the form of waves produces a flow of water which falls evenly on the soil and at the same time expedites the generation of drops of water because of its enlarged contact surface with the air. Drops of water will also be generated from the moisture evaporated from the soil. Drops of water will not easily be generated in the day time because there is no considerable difference of temperature between the open outside air and that of the inside of the floating boat, although it may be possible to generate drops of water even in the day time when a portion of plate 7 is made, for example, of a semi-transparent glass to obtain a higher temperature of the room 14 in order to utilize the difference in temperature between the open air flowing into the inside of the floating boat through the ventilation tube and the temperature thus warmed. The reservoir water in the water tank 10 is previously poured thereinto from the outside and the level of the water varies when the floating boat rolls or pitches. In such instances the water in the tank 10 contacts the suction or discharge holes 11 and thereby water in the water tank is absorbed into the soil. When the suction or discharge hole 11 does not contact the level of water in the water tank 10, the excessive amount of water in the soil drops into the water tank. The quantity of water in the water tank is selected so as not to contact the bottom of the cultivation housing 2 water is supplied from the outside when it diminishes in quantity. The air inside the cultivation room 13 is ventilated by means of the ventilation tubes 3a, 3b which are positioned so as to prevent an abnormal rise in temperature in the cultivation room. Discharge of air is carried out by means of the ventilation tube 3a positioned at a higher level and the suction is carried out by means of the ventilation tube 3b positioned at a lower level. The air inside the cultivation room 13 is thus discharged or admitted by means of the suction inlet 9a or the discharge outlet 9b formed as notches on the ventilation tubes. A change of temperature of the sea water or of the water inside the floating boat will not cause any unfavorable effect in the cultivation room because of the double wall construction provided inside the floating boat. The installation for crop cultivation according to the present invention has the structure as described hereinabove, and effectiveness of its use will be improved by constructing same as set forth hereinunder; in detail.

Figure 2:
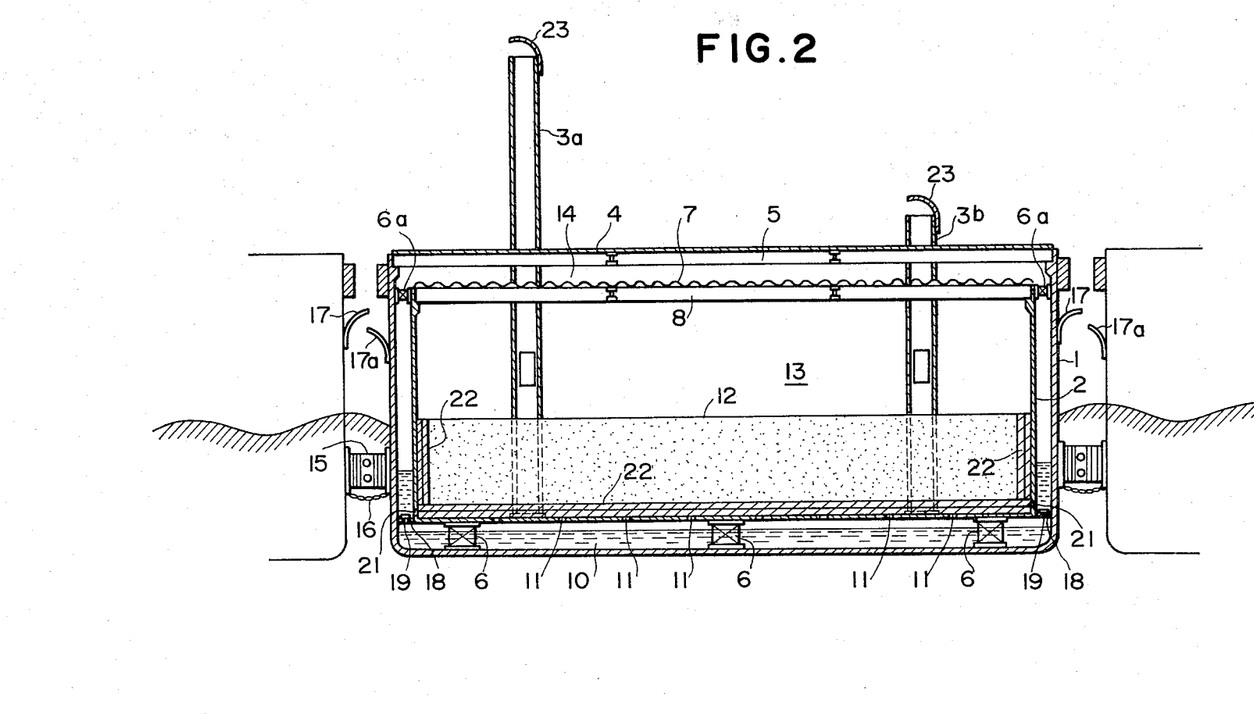
FIG. 2 is an elevational cross-sectional view showing another example of an installation for the cultivation of crops on water.

As shown in FIG. 2, additional installations for crop cultivation on water may be connected on both sides of the installation A.

Figure 3:
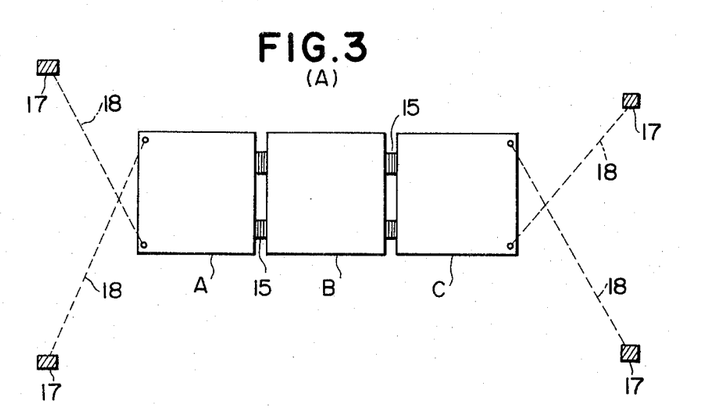
Figure 4:
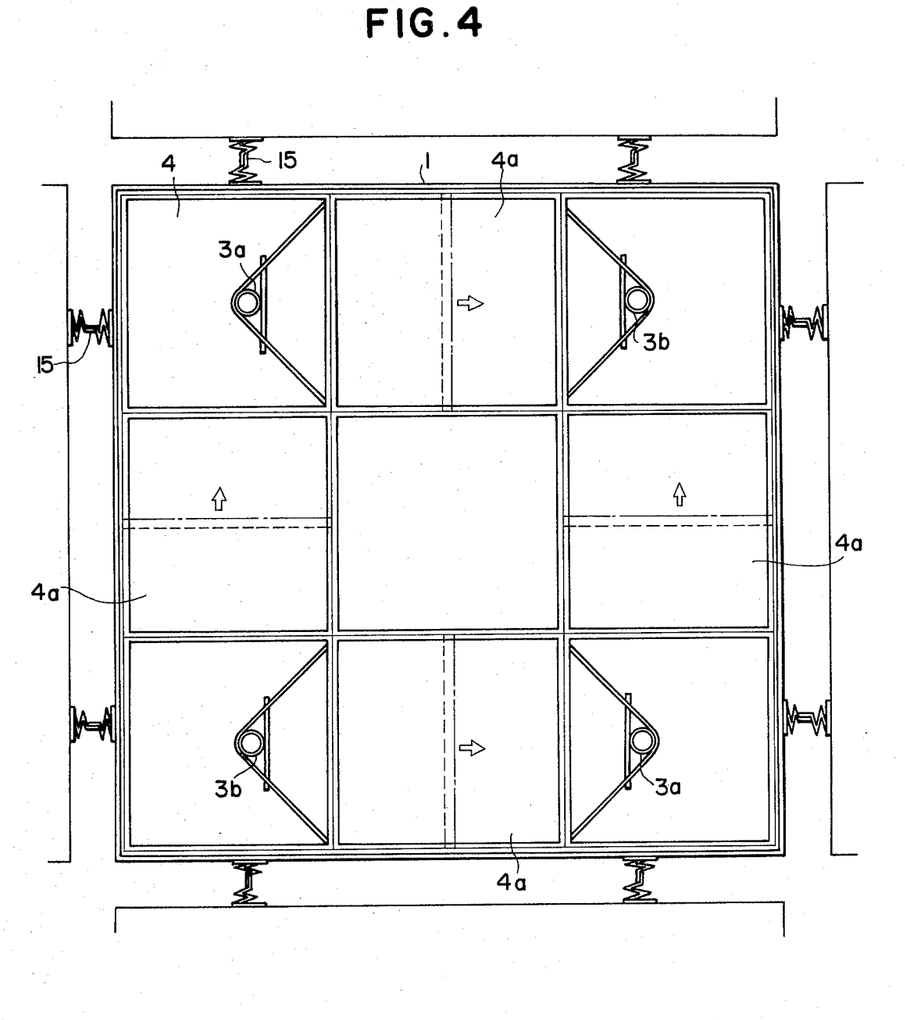
FIG. 4 is a plan view showing the plate glass roof.
Figure 5:
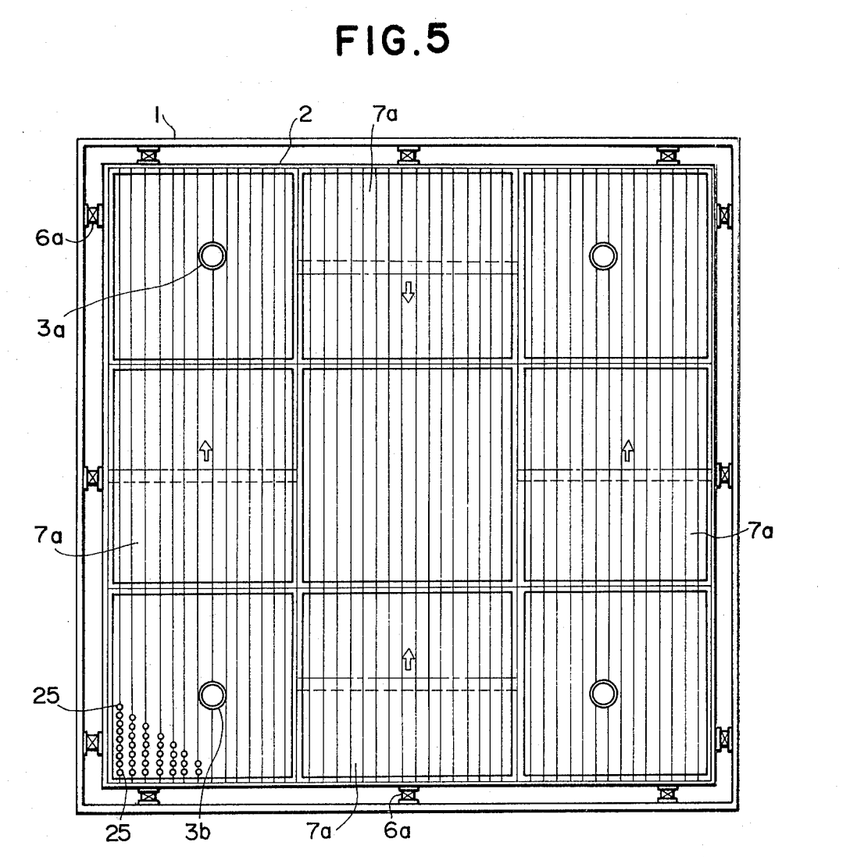
FIG. 5 is a plan view showing the drip plate of the installation.
Figure 6:
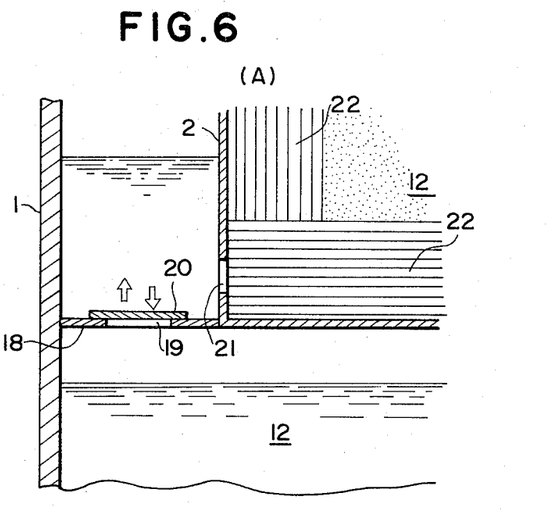
Figure 7:
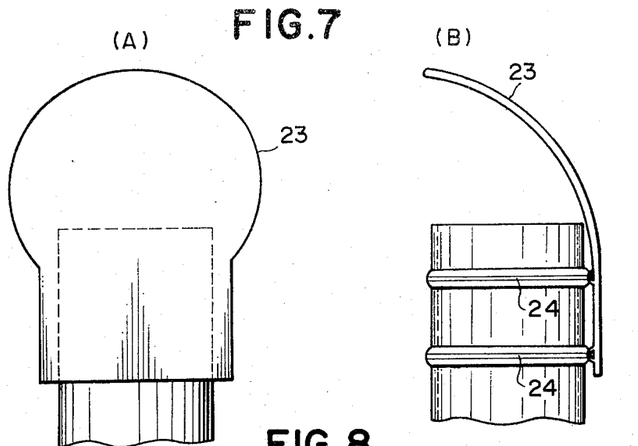
Figure 8:
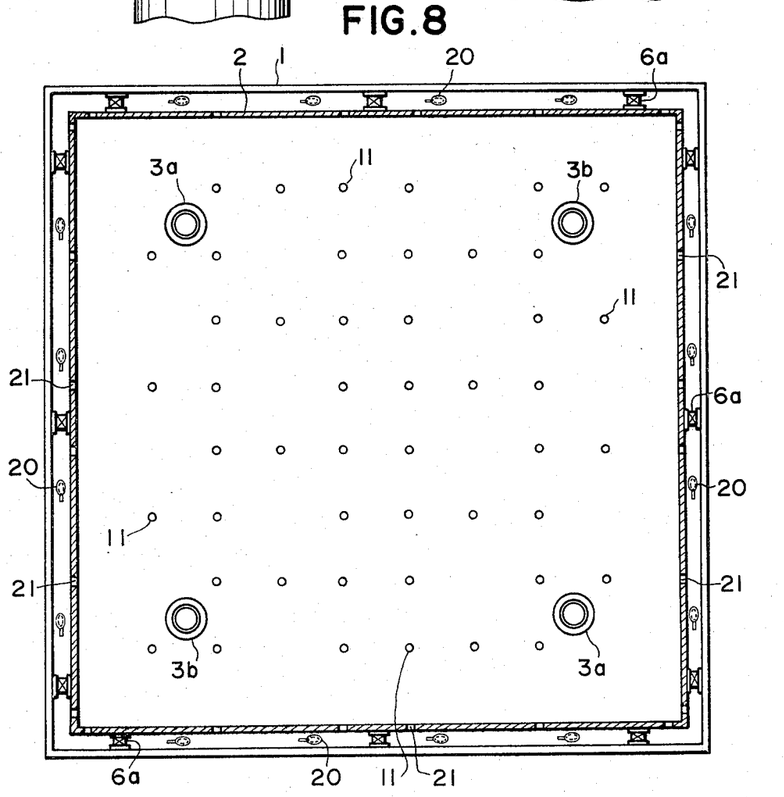
FIG. 8 is a plan view showing the disposition of check valves for preventing a counter flow of water and cooperating inlets.

Each of the installations is connected by a rubber joint 15 and a connecting chain 16. The impacts between each of the installations for crop cultivation caused by waves may be absorbed by the rubber joint 15. As shown in FIG. 3, each of the floating boats A, B, C, may be moved with a mooring chain 18 by means of an anchor 17, and each floating boat may be moved by means of a tugboat by pulling up the anchor. As shown in FIG. 4 and FIG. 5 respectively, the plate glass roof 4 and the plate 7 are marked off one section from another and an optional plate glass 4a and plate 7 may be divided to be able to open or close slidably so as to utilize same as an entrance for operations and also as a window for adjusting the ventilation. The upper surface of the installation A for the crop cultivation is covered with a plate glass, but it may that sea water or an extra amount of water would enter therein owing to waves or the spray waves. In order to prevent this, a washboard 17 is provided on the side of the floating boat as shown in FIG. 2. When more than one floating boat is connected with another, the washboards provided on the adjacent sides of the floating boats are mounted at different elevations so as to prevent waves firstly by the lower washboard 17a and remaining waves by the higher washboard 17, so that high waves rising between the floating boats will splash on the plate glass roof 4; but there will be no danger of waves entering into the floating boat. A partition strip 18 is provided between the water tank 10 and the double side wall. On an optional partition strip provided on both sides, one or a plurality of drainage holes 19 are formed and a check valve 20 for preventing a backward flow is, shown in FIG. 8, provided on the drainage hole. When the floating boat rolls, as shown in FIG. 6A and FIG. 6B, the level of water in the water tank 10 pushes up the check valve and discharges through the drainage hole 19, the water stayed between the double side wall entering inlet 21 provided on a lower end portion of the side wall of the cultivation housing, thereby the water in the water tank may effectively be poured onto the soil. An extra amount of water drops through the draining hole 11 into the water tank. As shown in FIG. 2 and FIG. 6-A, when a side strip 22 made of material with good absorptive or hygroscopic characteristics is provided on the peripheral surface contacted by the soil in the cultivation room, it may be possible to always supply uniform amounts of water to the soil, and furthermore corrosion of the side wall of the cultivation room due to the soil may be prevented. In the example, a thick wooden board is used as a side strip, and the absorptive characteristics are effective due to drainage hole 11 and inlet hole 21. Excess amounts of water drop through the drainage hole 11. As shown in FIGS. 7-(A) and (B), a hood 23 is provided covering an upper portion of the ventilation tubes 3a, 3b in order to prevent the introduction of excessive amounts of air and to also prevent pouring of a spray of waves into the tubes. The above-mentioned hood 23 in the form of an arm is fitted to a rotation guide ring 24 so that hood 23 may be freely rotatable around the ventilation tube throughout 360°. Thereby it is possible to adjust the intake or discharge of air and the prevention of wave sprays.

As described hereinabove, an installation for crop cultivation on water according to the present invention comprises the above-mentioned structures, and it can provide a suitable place wherein the cultivation of agricultural products utilizing fully the solar energy is possible on sea water or on lakes. It can be widely developed and utilized as a huge area for crop cultivation preserved for future use without any restrictions on the cultivation of agricultural products, being different from the conditions of its cultivation area as often seen on land. Furthermore, the cultivation of the crops on the water need not be exposed to air pollution noxious insects or plant disease cultivation of the crops thereon has the advantage of being suitable for growth conditions for crops with good qualities.

What is claimed is:

1. An installation for the cultivation of crops on water comprising:
    a box-like floatable outer housing;
    an inner cultivation housing supported within said outer housing and forming a double-walled bottom and double-wall sidewalls therewith, the bottom of said cultivation housing having a plurality of holes extending therethrough;
    a transparent plate glass roof on said outer housing in air-tight relationship therewith;
    a drip plate formed of plate glass having a plurality of holes extending therethrough positioned over said cultivation housing, said bottom and the region between said double-walled sidewalls being in communication with the interior of said cultivation housing through the holes in said drip plate;
    a plurality of ventilation tubes mounted in said cultivation housing and extending through said drip plate and roof for communication with the air above said roof, a first set of said ventilation tubes extending beyond said roof to a higher elevation than a second set of said ventilation tubes, a lower portion of each of said ventilation tubes being in communication with the interior of said cultivation housing;
    the interior of said cultivation housing being adapted to contain a quantity of soil and said bottom being adapted to contain a quantity of water, whereby water from said bottom is periodically and automatically evaporated and condensed for passage through the holes in said drip plate to prevent undue drying of the soil and to supply sufficient water to the soil to enable cultivation thereof.

2. An installation according to claim 1, wherein said first set of ventilation tubes comprise means for discharging air from the interior of said cultivation housing and said second set of ventilation tubes comprise means for introducing outside air into the interior of said cultivation housing.

3. An installation according to claim 2, wherein notched openings are formed in said ventilation tubes at an elevation within said cultivation housing above the level of soil therein.

4. An installation according to claim 1, wherein at least a portion of said drip plate is formed of semi-transparent plate glass.

5. An installation according to claim 1, wherein said roof and drip plate include at least one section which is slidable to thereby afford selective accessibility to the region between the drip plate and roof and to the interior of said cultivation housing.

6. An installation according to claim 1, wherein a partition member is positioned between the walls of said double-wall sidewalls above said bottom, said partition member extending peripherally about the wall of said cultivation housing, a plurality of drainage holes being formed in said partition member, a check valve mounted in each said drainage hole, whereby water in said bottom may be discharged through said drainage holes and is prevented from draining back into said bottom.

7. An installation according to claim 6, wherein a plurality of inlet openings are formed in the lower wall of said cultivation housing for admission of accumulated water above said partition member into said cultivation housing.

8. An installation according to claim 1, wherein a resilient joint is provided on at least one side thereof for connecting the installation with adjacently disposed like crop cultivation installations.

9. An installation according to claim 1, wherein the upper extremities of said ventilation tubes are provided with rotatable hoods for shielding said tubes against the intake of water and for controlling the introduction and discharge of air.

* * * * *